Fig. 5

Gareld R. McEathron
INVENTOR.

BY Lee R. Larkin

ATTORNEY

Dec. 30, 1969          G. R. McEATHRON          3,486,685

ENGINE-COMPRESSOR CONTROL SYSTEM AND METHOD

Filed April 8, 1968          10 Sheets-Sheet 7

Fig. 7

Gareld R.
Mc. Eathron
INVENTOR.

BY Lee R. Larkin

ATTORNEY

United States Patent Office 3,486,685
Patented Dec. 30, 1969

1

3,486,685
ENGINE-COMPRESSOR CONTROL SYSTEM
AND METHOD
Gareld R. McEathron, Houston, Tex., assignor to
Tenneco Inc., Houston, Tex., a corporation of
Delaware
Filed Apr. 8, 1968, Ser. No. 719,407
Int. Cl. F04b 49/00
U.S. Cl. 230—21                             8 Claims

ABSTRACT OF THE DISCLOSURE

A control system and method for an engine connected to operate a compressor having pockets which are arranged for opening and closing to vary engine torque loading and throughput. It is a system and method which will automatically and continuously monitor torque loading on an engine connected to a compressor and regulate the torque load to match variable limits.

---

This invention relates to a control system and method for an engine connected to operate a compressor having pockets which are arranged for opening and closing to vary engine torque loading and throughput. More particularly, the invention relates to the control of torque loading of a reciprocating engine, for example, and more particularly, to an engine compressor system.

When designed for operation under widely varying compressor pressures, reciprocating engine compressor sets are constructed in such a manner that the compressor end of the engine can be loaded to values which will cause the engine to drive itself to destruction while attempting to maintain the compressor load.

Whereas reciprocating engines are similar in basic design, each engine manufacturer builds in differences which result in a variety of limiting parameters which must be considered when determining the maximum torque load to which the engine may be operated.

It is an object of this invention to provide an improved system and method which will automatically and continuously monitor the torque loading of an engine and regulate the torque load to match variable limits. Parameters which define the torque limits must be measured and the measurements used to compute the torque limits.

It is a further object of this invention to provide an improved system and method for a torque control which is versatile and which may be used with various configurations of engines with only minor modifications.

It is a further object of this invention to provide both method and apparatus which are relatively simple, which provide a maximum reliability and require the use of a minimum of complex equipment.

A still further object of this invention is to provide an improved apparatus and method for selectively operating individual pockets of a compressor in either a manual or automatic mode whereby the pockets in the automatic mode automatically compensate for pockets being operated in the manual mode.

Briefly stated, the invention is for a control system for an engine connected to operate a compressor having pockets which are arranged for opening and closing to vary engine torque loading and throughput. The system includes the combination of means for generating a first electrical signal representative of torque load on the engine. It also includes an electrical controller circuit connected to receive the first signal as the measurement input and arranged to provide an electrical output which is related to a torque set point. Means are also provided for varying the torque set point in response to changes in operating conditions of the engine and throughput requirements. Means are also provided for applying the output to a pneumatic sequencer to open and close the pockets in the compressor to thereby vary the torque load on the engine in response to variations in the torque set point.

Briefly stated, the method of this invention is for controlling torque load on an engine connected to operate a compressor having pockets which are arranged for opening and closing to incrementally vary engine torque loading and throughput. It includes the steps of generating a first electrical signal representative of torque load on the engine. It also includes generating a second electrical signal representative of a change in at least one operational parameter of the engine and throughput requirements. A third electrical signal is generated which varies as a function of the deviation of the first signal relative to the second signal. The third signal is then applied to a pneumatic sequencer to open and close pockets in the compressor to thereby vary the torque load on the engine in response to variations in the second signal relative to the first signal.

Reference to the drawings will further explain the invention wherein.

One method of determining the torque load on an engine is by measurement of the inferred work done by the engine as a function of the energy input to the engine. The preceding is based on the following statements:

(a) The energy output of an engine is a function of the energy input.

(b) The fuel consumption (chemical energy input) times the efficiency of the engine is equal to the horse power output.

(c) Horsepower is proportional to speed times torque; therefore, torque can be calculated as a ratio of speed and fuel consumption.

Once a torque signal is generated, it is used as the measurement input to a controller which opens and closes pockets as required to adjust the engine torque to match a torque set point. The torque set point is varied to provide variable torque loading.

It can be seen that changes in engine performance or compressor loading will require changes in fuel flow to maintain speed. Since the torque signal is a function of r.p.m. vs. fuel consumption, the control system will adjust pockets to maintain the load per power cylinder at the rated value for normal operation.

Figures 1, 2:
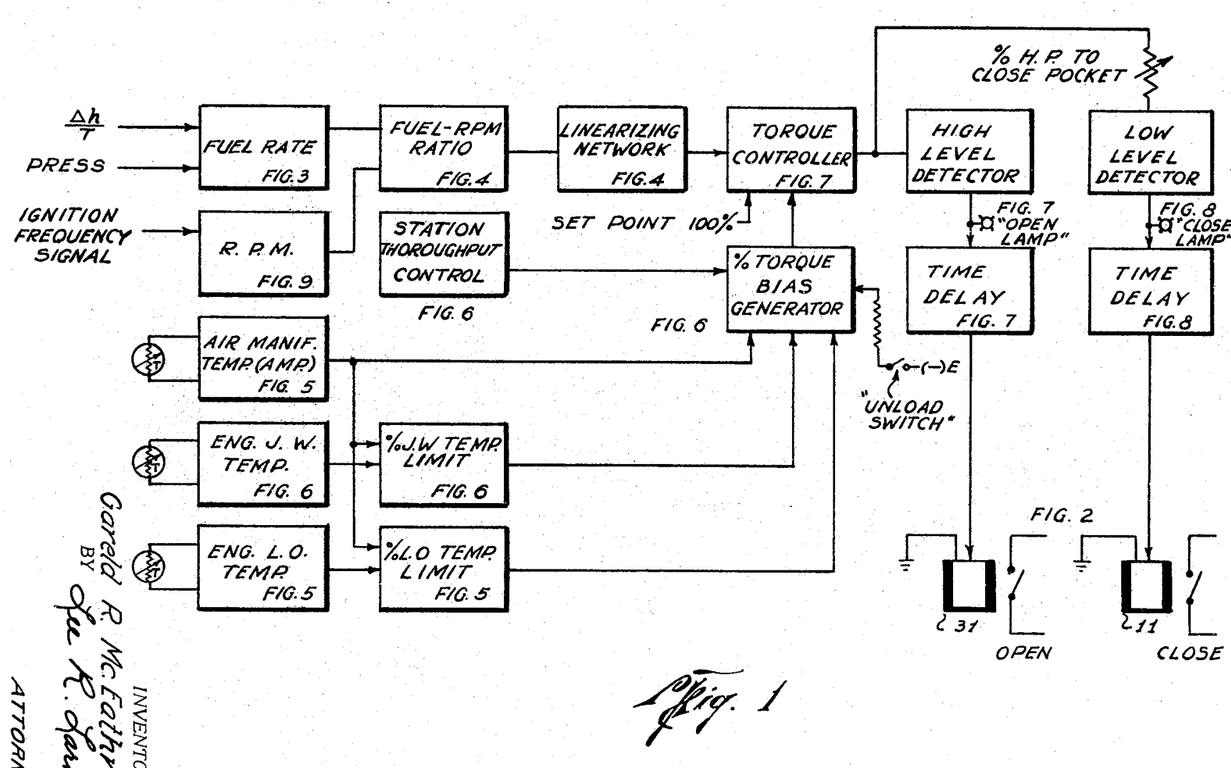
FIG. 1 is a block diagram of a portion of the system.
FIG. 2 is a generally schematic diagram of another portion of the system and is generally an extension to the right of FIG. 1.
Figure 2:
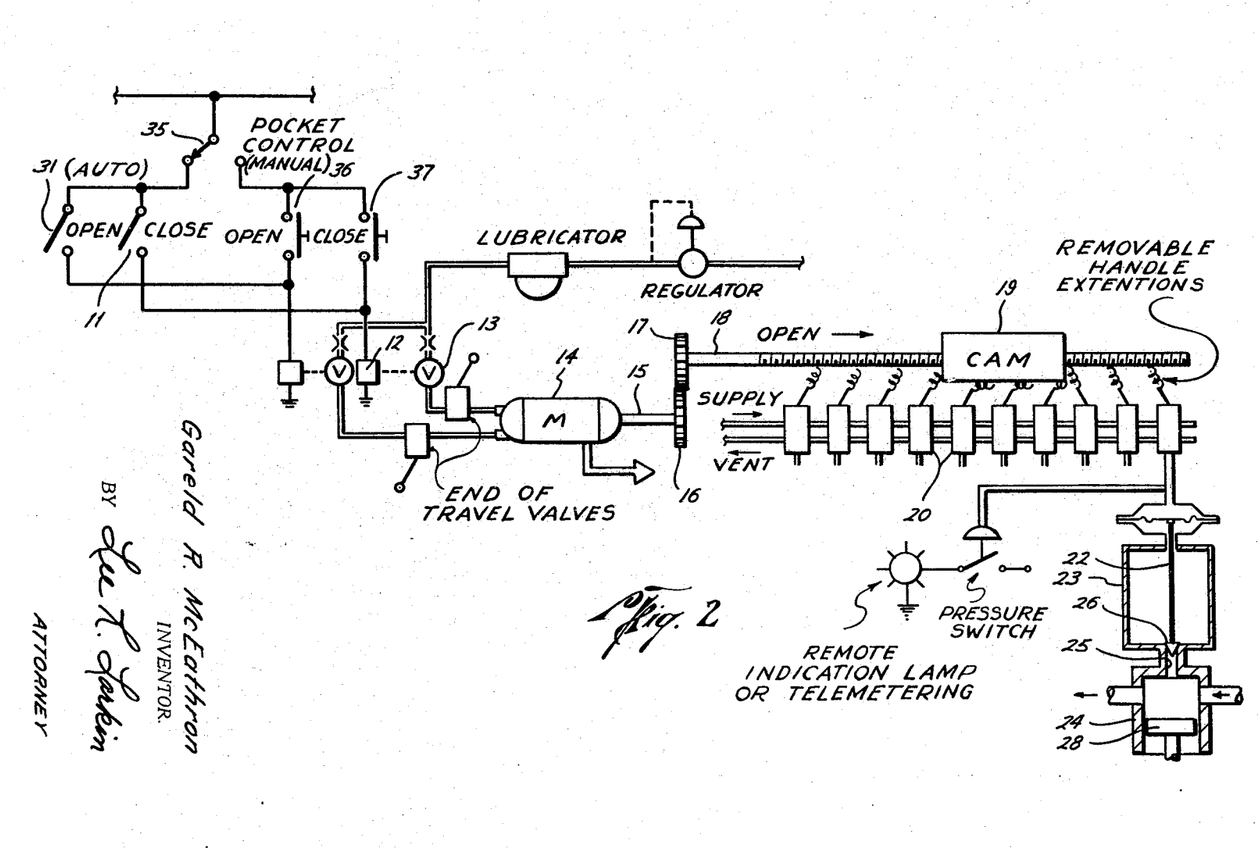
Figure 9:
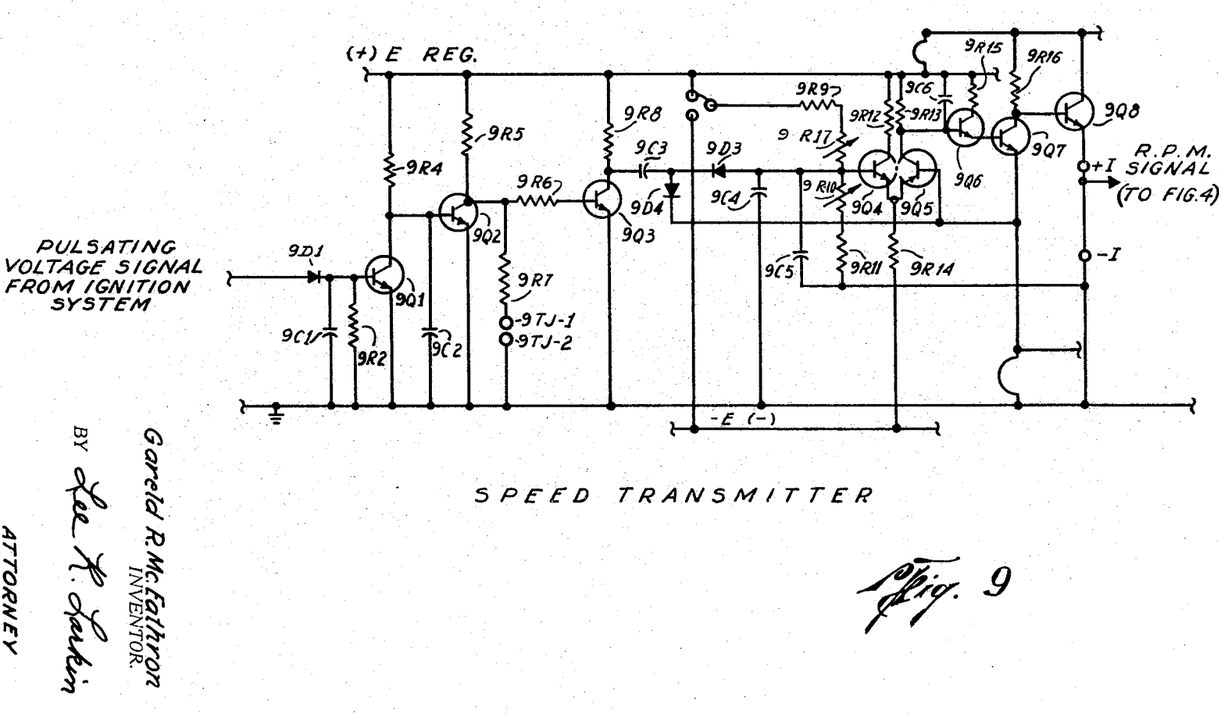
FIG. 9 is a circuit diagram of the speed transmitter, or r.p.m. circuit, as shown in FIG. 1.

Referring now to the drawings, and FIG. 1 in particular, the control system performs the following functions:

(a) Measures speed (r.p.m.) by converting the ignition pulse frequency to a DC voltage proportional to r.p.m. (0 to 10 volts equals 50% to 100% or rated speed). (FIG. 9)

Figure 3:
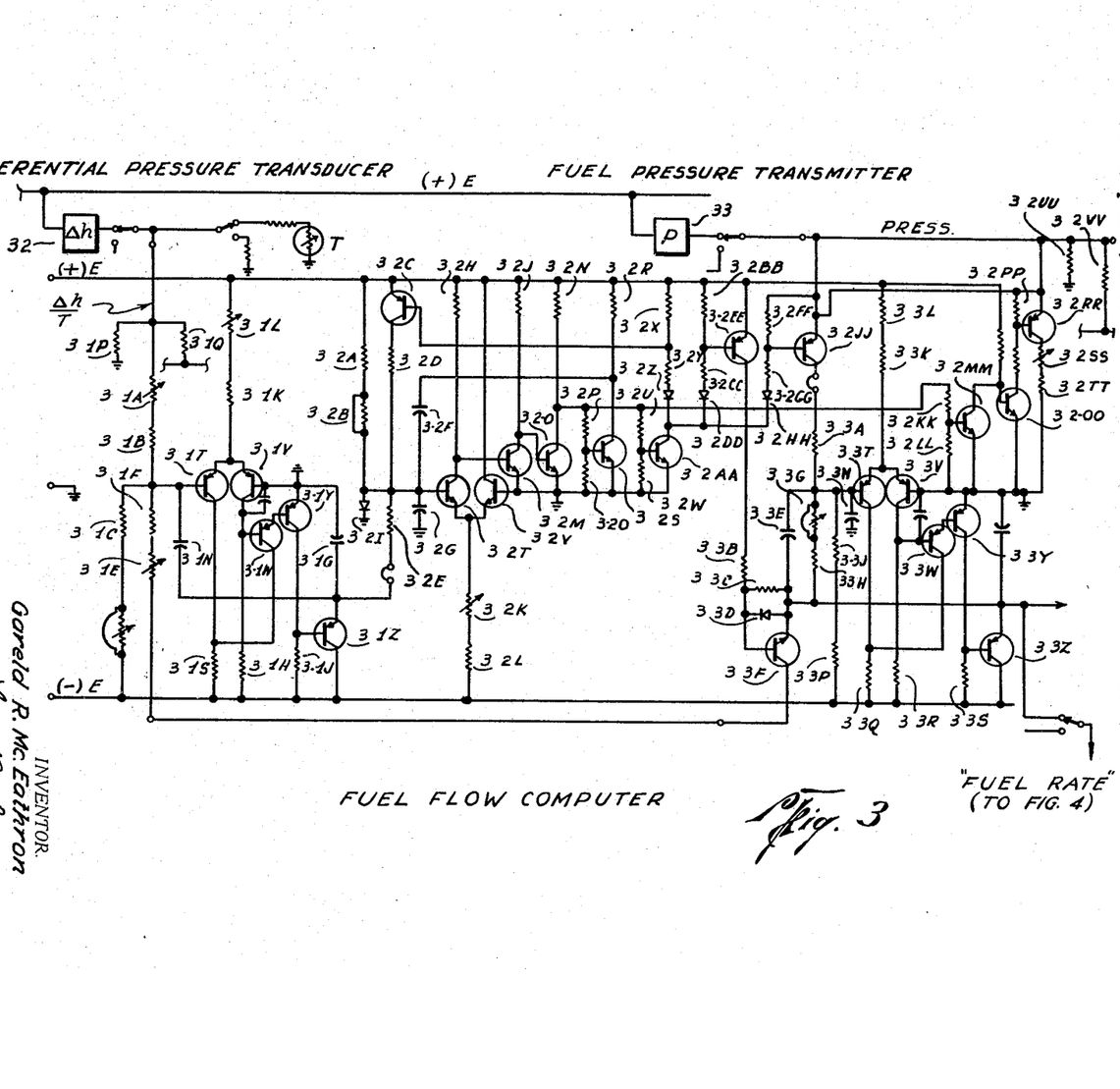
FIG. 3 is a diagram showing the preferred circuit for sensing fuel consumption of the engine.
Figure 4:
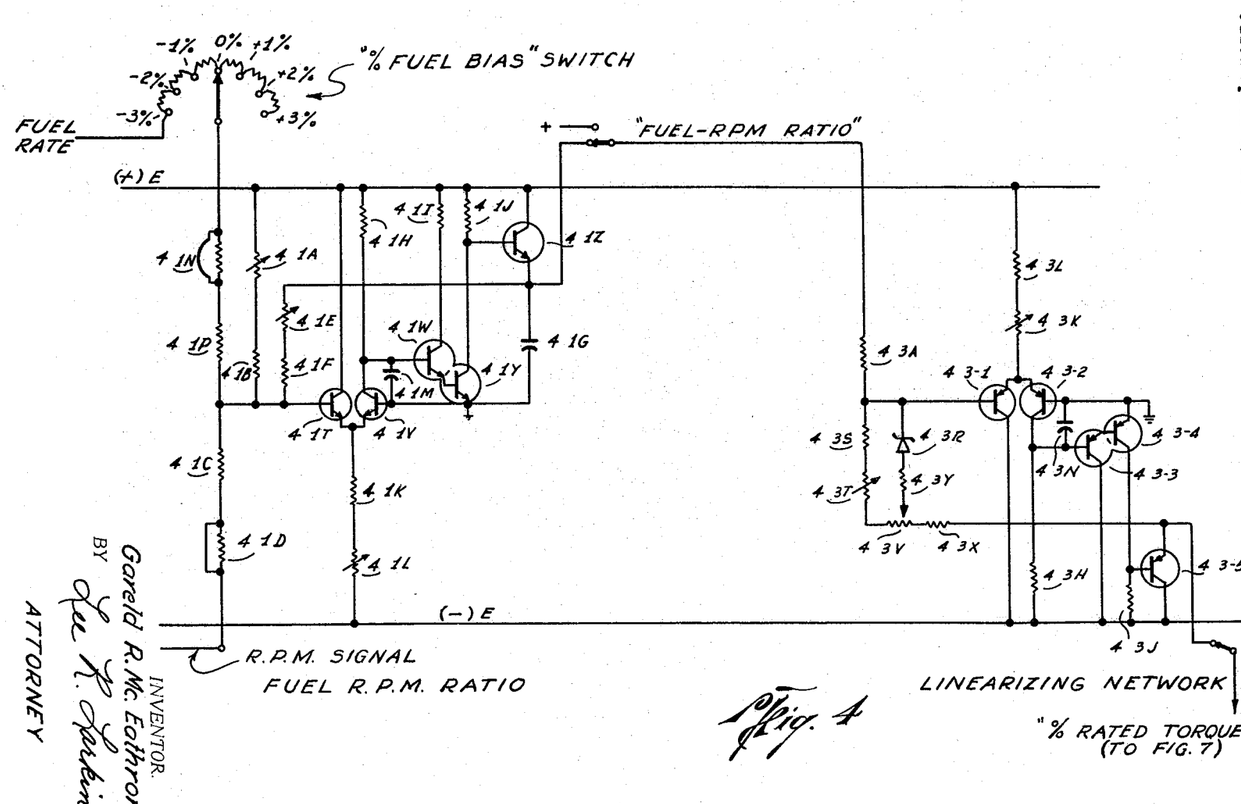
FIG. 4 shows another portion of the electrical circuit which computes the fuel-r.p.m. ratio and the linearizing network shown in FIG. 1.

(b) Computes fuel flow as a function of $\Delta h$, pressure and temperature signals from a meter run installed on the engine fuel line. $MCFH = C'(\Delta hP/T)^{1/2}$ (FIGS. 3 and 4)

(c) Computes torque as a function of speed and fuel flow. (FIG. 4) If the B.t.u./BHP ratio is a nonlinear function of percent rated torque, the torque signal is attenuated by a linearizing network to simulate the actual percent rated torque curve.

Figure 7:
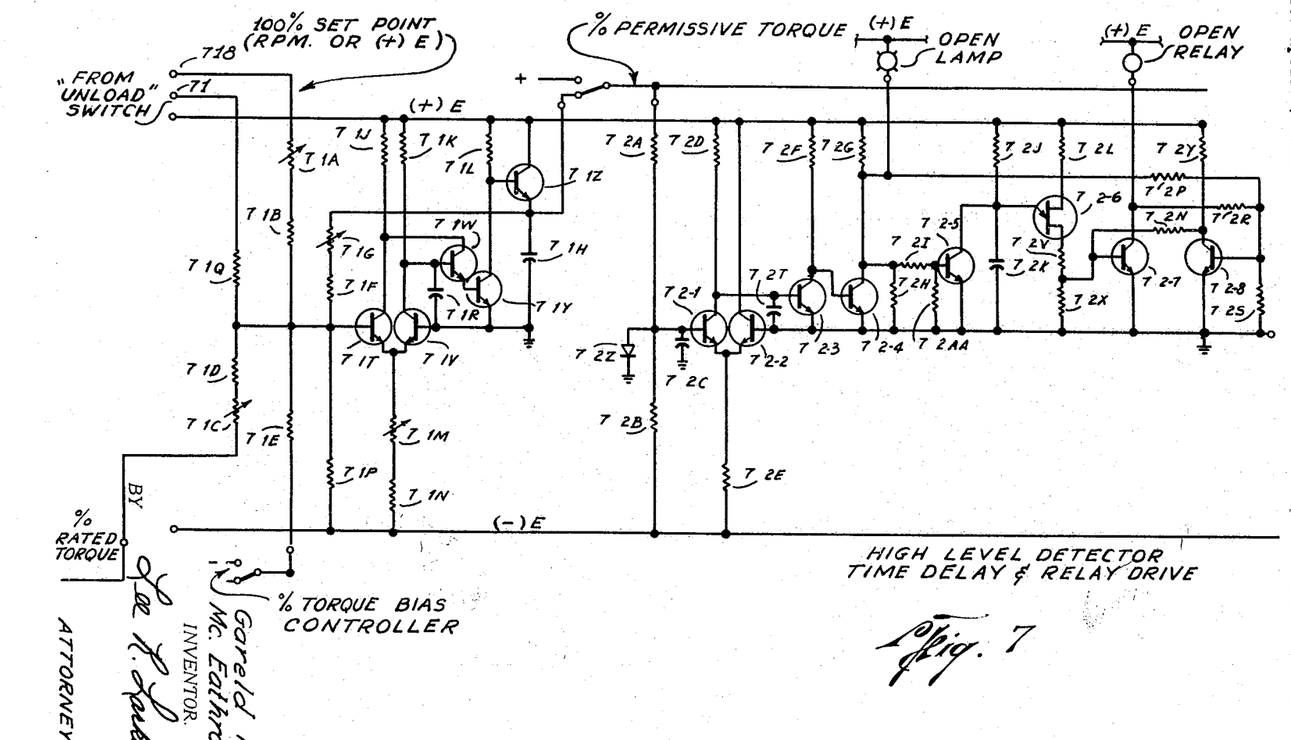
FIGS. 7 and 8 also comprise generally one figure, with the FIG. 7 portion being to the left and the FIG. 8 portion being to the right, and together show the electrical circuit for the torque controller, and the high and low level detector circuits.

(d) The rated torque signal is fed into the torque controller as the process measurement. (FIG. 7)

(e) The percent torque set point to the torque controller is variable as the function of several parameters:

(1) *Speed.*—The speed signal plus a constant provides a set point of 100% rated torque at 100% speed. This set point is reduced to 70% rated torque at 50% speed. (This feature is used on engines with fixed ignition timing.)

Figure 6:
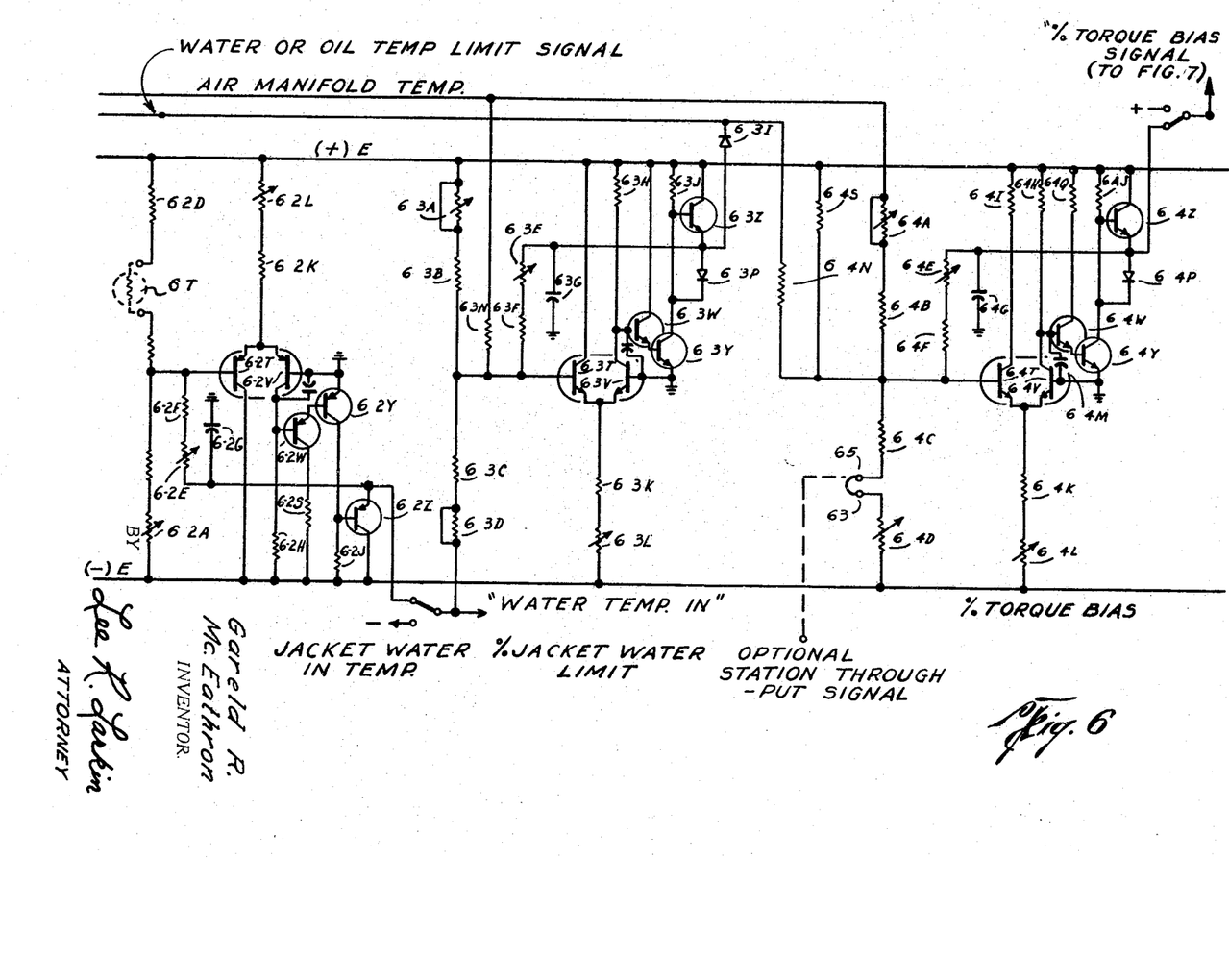

(2) *Station throughput control.*—As station throughput requirements are exceeded, the maximum permitted torque is reduced proportionally to 100% of rated torque. (FIG. 6)

(3) *Temperatures.*—

Figure 5:
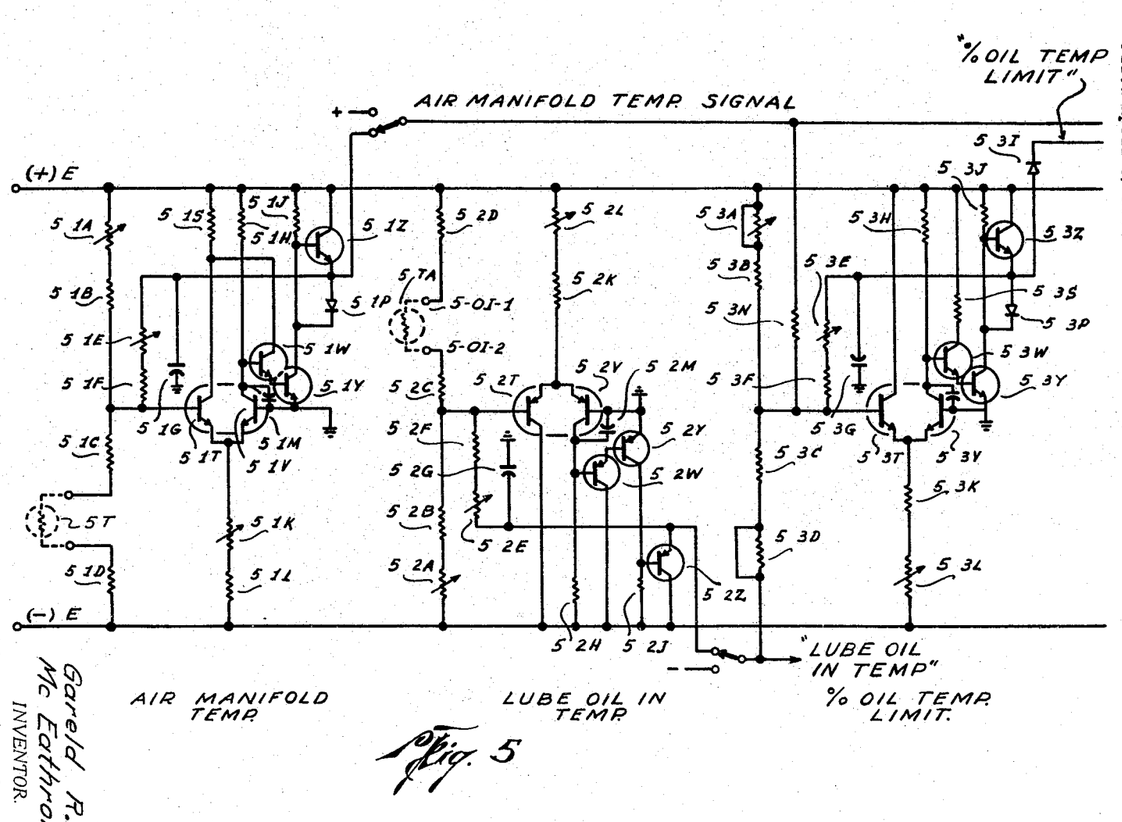
FIGS. 5 and 6 comprise one figure, with FIG. 5 being the portion to the left and FIG. 6 being the portion to the right, and together show the circuit for sensing the air manifold temperature, engine jacket water temperature, engine lube oil temperature and the percent torque bias circuit.

(a) As the air manifold temperature is reduced from 130° F. to 80° F., the percent torque bias signal is increased proportionally from 0 to ±24%. (FIG. 5.) This illustration applies to the aforesaid Clark Brothers engine, and other engines have different recommended operating temperatures.

(b) As the percent rated torque is increased from 100% to 124%, the engine jacket water inlet temperature must be reduced proportionally from 155° F. to 120° F. In the event the water temperature does not drop proportionally faster than the air manifold temperature, the water temperature becomes a limiting factor and generates a signal designated percent Jacket Water Temperature Limit which subtracts as an equal percent from Percent Torque Bias signal. (FIG. 6)

(c) As the percent rated torque is increased from 100% to 124%, the engine lube oil inlet temperature must be reduced proportionally from 145° F. to 110° F. In the event the lube oil temperature does not drop proportionally faster than the air manifold temperature, the tube oil temperature becomes a limiting factor and generates a signal designated as Percent Lube Oil Temperature Limit which subtracts an equal percent from the Percent Torque Bias Signal. (FIG. 5)

(4) *Unload.*—The unload relay is operated by circuitry in the engine control panel and introduces a (−) 200% rated torque set point which will cause the system to sequentially open all pockets. (FIG. 7, pin 71)

Figure 8:
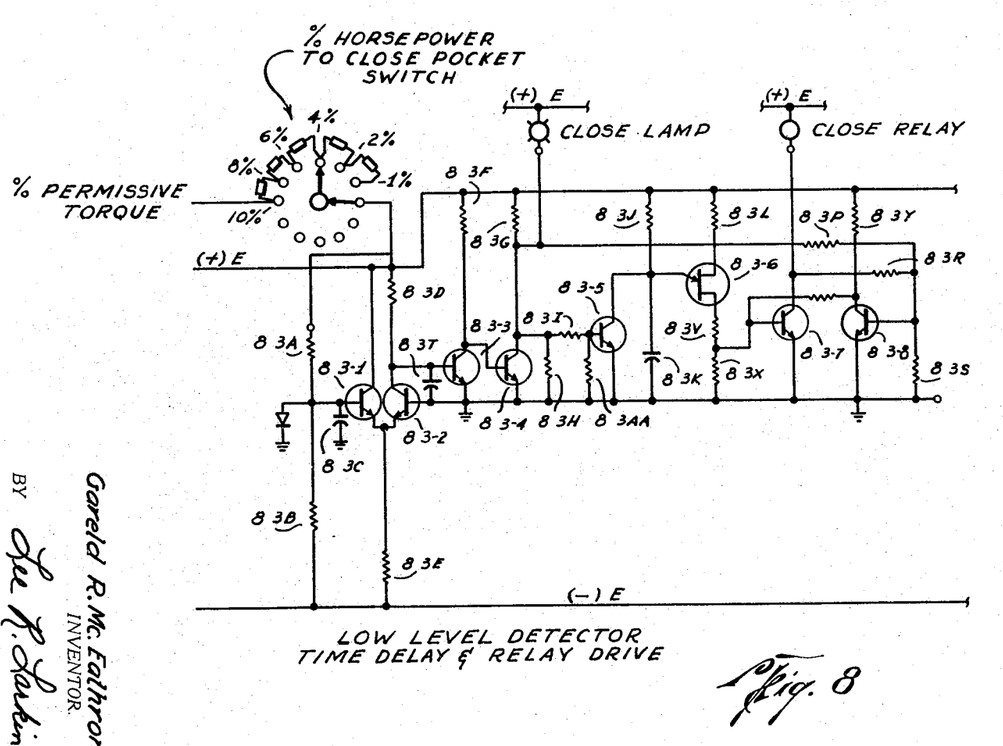

(f) Since the torque controller operates in the proportional mode only, the output is proportional to the deviation of the percent torque from the set point signal and is designated Percent Permissive Torque. For example, if the percent rated torque was at 97% and the set point at 100%, the Percent Permissive Torque signal would be (−) 3%. The Percent Permissive Torque signal is connected to high and low level detectors. (FIGS. 7 and 8.) The high level detector is set to initiate an open signal 10 seconds after the Percent Permissive Torque Signal exceeds 0%. The low level detector is set to initiate a close signal 30 seconds after the Percent Permissive Torque Signal falls below a value selected on the Horsepower To Close Pocket switch. For example: −1%, −2%, −4%, −6%, −8% or −10%. The open and close signals are connected to the pneumatic pocket sequencer. (FIG. 2) which sequentially opens and closes pockets in a predetermined order.

A signal from the time delay circuit connected to the low level detector is arranged to operate close relay switch 11, which then provides an electrical signal to solenoid 12, which opens valve 13 in air pressure line leading to air motor 14, which rotates shaft 15 and drive gear 16, which in turn rotates pinion gear 17 and cam shift 18. Shaft 18 has mounted thereon a cam 19 which is adapted to move relative to a plurality of micro-toggle valves 20, each of which is connected to a diaphragm control 21 which has connected thereto a valve stem 22 passing downwardly through a pocket 23 connected to the top of a compressor cylinder 24 with port 25 therebetween. Port 25 is arranged to be closed by valve head 26 attached to valve stem 22. Hence, when close relay switch 11 is closed, cam 19 is caused to move to the right, as viewed in FIG. 2, thereby closing additional pockets 23 and thereby increasing the torque load on the engine operating the compressor, since the volumetric efficiency of compressor cylinder 24 is increased when valve head 26 seats in port 25.

Conversely, when a signal is applied to open relay switch 31 from the high level detector, air motor 14 is caused to operate in reverse direction in the same manner and cam 19 is moved to the left relative to valves 20 and additional pockets 23 are opened.

It is to be understood that, as shown in FIG. 2, the system may be provided with a master Manual-Automatic switch 35 whereby the system may be operated in either the manual mode or the automatic mode. It also includes a manual Open switch 36 and a manual Close switch 37. It is to be noted that a defective pocket may be bypassed from cam actuation by removal of the applicate handle extension of the valve 20. Since the control system sequentially operates pockets until the desired torque is achieved, pockets which are not available for cam actuation will be compensated for by actuation of the pocket next available in the sequence.

FIG. 3 is a schematic diagram of the fuel rate computer. The flow rate equation being solved is $$Q = C^1 \left(\frac{\Delta hP}{TF/520}\right)^{1/2}$$

This flow equation is derived from the Report No. 3 of the Gas Measurement Committee, American Gas Association, 605 Third Avenue, New York, N.Y. 10016, which outlines recommended practices for flow measurement in orifice type meter runs.

It will be shown where the computation $$Q = C^1 \left(\frac{\Delta hP}{TF/520}\right)^{1/2}$$

is performed in one simple closed loop computation as opposed to individual calculations of:

(1) $\Delta h\, P/T$
(2) Square root of item 1
(3) C-prime times item 2

The term $\Delta h/T$ is generated by constant transducer 32 connected to the engine fuel line from which the output current is connected to a load which changes resistance as a function of the absolute flowing temperature of the gas. It can therefore be seen that the voltage drop across the load will be $\Delta h/T$. This voltage is connected across resistors 31A and 31B to provide one leg of an input current to an amplifier consisting of transistors 31T, 31V, 31W, 31Y and 31Z. The output of this amplifier is taken from the emitter of transistor 31Z and goes through resistor 32E to the base of transistor 32T. It can be seen that transistors 32T and 32V are connected in a differential amplifier mode. It can also be seen that transistors 32T, 32V, 32M, 32O, and 32S comprise a circuit which will switch 32S into the conducting state at any time the base of transistor 32T goes slightly negative. When transistor 32S goes from a nonconducting to the conducting state, capacitor 32F will be discharged to further reduce the voltage on the base of transistor 32T. It can also be seen that as transistor 32S is turned on, transistor 32C is also turned on to provide a path for positive current to the base of transistor 32T. Resistor 32D is so sized that the current through resistor 32D will be equal to the current through resistor 32E when the output from transistor 31Z is at a maximum. It can be seen that when the voltage output from transistor 31Z is less than maximum, the current to resistor 32E will be less than the current through resistor 32D. The difference in these two currents will be used to charge capacitor 32G. As capacitor 32G is charged, the base voltage of 32T will rise until it reaches a value positive with respect to ground which will cause transistor 32T to turn on and, in turn, through interaction with transistors 32M, 32O, and 32S, will cause transistor 32C to turn off. The effect of this circuit is to provide an output switching circuit in which the ratio of the on-time to the off-time is proportional to the ratio of the actual output voltage of transistor 31Z to the maximum output voltage of transistor 31Z.

It can be seen that the output of fuel pressure transmitter 33 (also connected to the engine fuel line) is connected through transistor 32JJ and resistor 33A to provide an input current to the amplifier consisting of transistors 33T, 33V, 33W, 33Y and 33Z. Since transistor 32JJ is switched on and off at the same point in time as transistor 32C, it can be seen that the voltage across resistor 33A is proportional to the fuel pressure voltage times the ratio of the output voltage of transistor 31Z to the maximum output voltage of transistor 31Z. The output voltage of transistor 33Z is connected to provide a negative feed back to the base of transistor 33T through resistors 33H and 33G. This insures that the output voltage at the emitter of transistor 33Z will be a function of and proportional to the input current through resistor 33A. The output voltage at the emitter of transistor 33Z is connected through transistors 33F and resistors 31E and 31F to the base of transistor 31T. Since transistor 33F also turns on and off at the same point in time as transistor 32C, it can be seen that the current through resistors 31E and 31F is proportional to the output voltage at the emitter of transistor 33Z times the ratio of the voltage at the emitter of 31Z to the maximum voltage at the emitter of 31Z. Resistors 31E and 31F are sized and adjusted to provide the function of C-prime.

To illustrate the operation of the circuit it can be seen that any four times increase of an input variable should cause a two times increase of the output variable. For example, a fourfold increase of $\Delta h/T$ would cause a fourfold increase in the current through resistors 31A and 31B. This would cause a negative excursion of the voltage on the emitter of transistor 31Z and an increase in current through resistor 32E. The current through resistor 32E will continue to increase until such time as the sum of the currents through resistors 31A, 31B, 31F and 31E are algebraically equal to zero. As the current through resistor 32E increases, the ratio of the on-time to off-time of transistors 32C, 32JJ, and 33F will increase. This increase in on-time will result in a higher current through resistors 33A, 31E and 31F. It can be seen that as the on-time of transistor 32JJ reaches a point of twice its initial on-time, the current through resistor 33A will be doubled and therefore the output voltage at the emitter of transistor 33Z will be doubled. At the same time the on-time of transistor 33F is doubled which, in conjunction with the doubling of the output voltage, results in a quadrupling of the currents through resistors 31A and 31B. Once again, the algebraic sum of the currents through resistors 31A, 31B, 31F and 31E is relatively equal to zero and the circuit is stable.

As mathematical proof of the operation, assign "X" equal to the voltage at the emitter of transistor 31Z, it therefore follows that the voltage drop across the resistor 33A is equal to X times the absolute pressure and that the output voltage will be equal to minus XP. It can also be seen that the voltage drop across transistors 31E and 31F will be equal to the output voltage times X and since the output voltage is XP then the voltage drop across resistors 31E and 31F is $X^2P$. Since the current through resistors 31A and 31B is equal to the current through resistors 31F and 31E, it can be said that $\Delta h/T$ is equal to $X^2P$. Solving for X, it is found that X is equal to the square root of $\Delta h/T$. Since it was previously found that the output is equal to minus XP, it is now therefore proper to substitute the square root of $\Delta h/T$ for X. This will give an output equal to minus the square root of $\Delta h/T$. Since the term $C'$ is a constant, resistors 31E and 31F are sized to give an output equal to $C'$ times the square root of $\Delta h\, P/T$.

Transistors 32MM, 32OO, and 32RR (FIG. 3) and their related circuits perform the function of maintaining a constant impedance load for full pressure transmitter 33.

As previously stated, torque is proportional to a ratio of fuel consumption and speed. An ideal plot of fuel consumption versus speed for a condition of constant torque would result in a straight line originating at co-ordinates 0—0 and extending into the first quadrant. It can be shown that the equation of such a straight line is $$X - \left(\frac{A}{B}\right) Y = 0$$

By letting X=fuel consumption and Y=r.p.m., it can be seen that the ratio of $A/B$ can be implemented by the ratio of the currents through resistors 31P and 31C.

In keeping with the aim of simplicity of operation and maintainability, the percent rated torque signal was designed to have full scale deflection between 80% and 130% of rated torque.

Referring now to FIG. 4, transistors 41T, 41V, 41W, 41Y and 41Z form an operational amplifier with resistors 41E and 41F providing a negative feedback path. The inputs to this amplifier consist of current through:

(1) Resistors 41D and 41C proportional to speed.
(2) Resistors 41P and the percent fuel bias resistors proportional to fuel consumption.
(3) Resistors 41A and 41B which is equal and opposite to the fuel consumption current at minimum (50%) r.p.m. and minimum (80%) torque.

It can be seen that the amplifier output voltage will be zero for any value of torque less than 80% of rated torque. At any time the current through resistor 41P is greater than the sum of the currents through resistors 41B and 41C, the operational amplifier output voltage will go positive to a value such that the current through resistors 41E and 41F is equal and opposite to the difference in the above currents. Resistors 41E and 41F are sized to provide a 10,000 volts change in the fuel-r.p.m. voltage for a 50% change in torque.

The previously generated signal is based on the theory that for any given percentage change in torque there will be an equal percentage change in fuel consumption. Once again, depending on the design theories of the various engine manufacturers, this is not always the case. Based on fuel consumption measurements by either the engine user or the engine vendor, curves are plotted of fuel consumption versus torque at various speeds. These characteristic curves are then simulated by an operational amplifier consisting of transistors 43–1, 43–2, 43–3, 43–4 and 43–5, with resistors 43X, 43V, 43T, 43S, 43Y and Zener Diode 43R, connected to form a non-linear feedback network. (FIG. 4.) It has been found that the differences in fuel consumption characteristics of various engines can usually be compensated for merely by changes in the value of resistor 43Y and adjustments to potentiometers 43V and 43T.

As was previously indicated, various engine temperatures enter into the computation of permitted torque. Since the control system requires electrical signals for computation, it is necessary to generate an electrical voltage which is proportional to the required temperature. Referring now to FIGS. 5 and 6, it can be seen that transistors 51T, 51V, 51W, 51Y and 51Z form an operational amplifier with resistors 51E and 51F providing a negative feedback path. A thermistor 5T mounted in a thermowell in the air intake manifold and series resistors are connected to a negative reference voltage to provide an input to the operational amplifier. Since the resistance of thermistor 5T varies with temperature, the current through resistors 51D and 51C, and thermistor 5T will change as a function of temperature. Resistors 51A and 51B are connected to a reference voltage of opposite polarity to that to which thermistor 5T is connected. Resistors 51A and 51B are sized to provide a current which will be equal to the current through the resistors 51C and 51D, and the thermistor 5T at the minimum operating temperature (80° F., for example).

The above illustrates one manner of generating a voltage which changes as a function of temperature. As was seen in FIG. 1, the air manifold temperature is used as a torque set point so long as the lube oil into the engine and jacket water into the engine temperatures are maintained below maximums which are functions of the air manifold temperature.

Again referring to FIG. 5, thermistor 5Ta is mounted in a thermowell in the lube oil inlet line and connected to transistors 52T, 52V, 52W, 52Y and 52Z which comprise an operational amplifier in which resistors 52E and 52F form the feedback network. It is to be noted that all components are identical in configuration except for a reversal of polarity of those components forming the operational amplifier which generates the air manifold temperature voltage. The result is the oil temperature voltage is of opposite polarity to that of the air manifold temperature.

By reference to the engine torque versus engine temperature curves (FIG. 10), it can be seen that as the air manifold temperature decreases from 130° to 80° F. the oil temperature must decrease from 145° to 110° F. It can be seen from the chart that the engine temperature permitting the least amount of operating torque must become the limiting factor in generating a torque set point. A review of engine temperature cooling system economics revealed that the air manifold temperature would normally be the limiting factor. It was for this reason that the air manifold temperature was made the primary signal for generating torque set points in excess of 100%. As will be shown later, a voltage rise results in a decrease in permited torque.

Keeping in mind the intent of the invention to provide a system which can be maintained by personnel with a minimum of electronic background, it was elected to provide sensible readouts of all limiting functions. In FIG. 5, it can be seen that transistors 53T, 53V, 53W, 53Y and 53Z form an operational amplifier with resistors 53E and 53F providing the negative feedback. The inputs to the amplifier consist of currents through resistors 53A, 53B, 53C, 53D and 53N.

Figure 10:
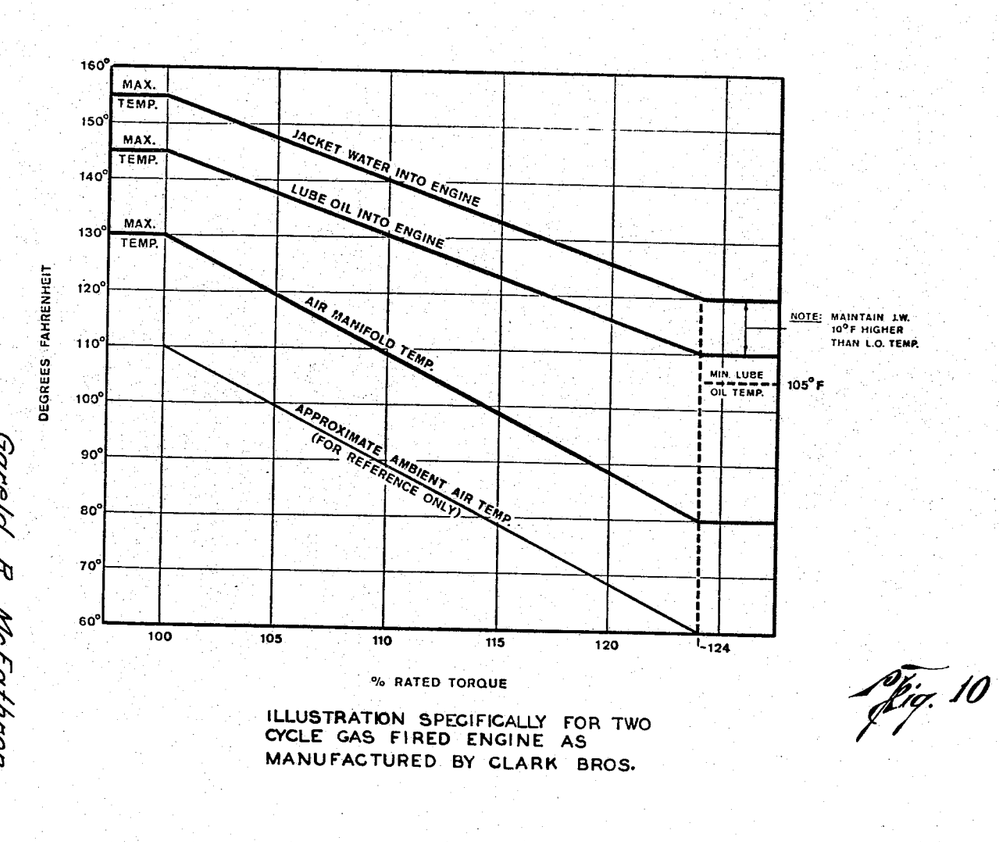
FIG. 10 is a graph showing the relationship between various engine operating parameters in terms of temperature and percent rated torque. The graph, as shown, is as recommended for a particular engine, i.e., a two-cycle gas fired engine manufactured by Clark Brothers of Olean, New York. This is for illustrative purposes only, it being understood that other engines would have different recommended parameters.

Referring again to the engine temperatures versus percent rated torque curves (FIG. 10), it can be seen that at 80° F. air manifold temperature, the percent rated torque signal is at a maximum of 124% so long as the oil temperature into the engine is less than 110° F. The oil temperature voltage is negative and therefore any increase in oil temperature will cause an increase in the oil temperature limit voltage. As previously stated, the oil temperature should not have a limiting effect until it reaches 110° F. which is represented by a −1.5 volts. Resistors 53A and 53B are sized to provide a current equal to, and opposite in polarity to that which is supplied by the oil temperature at 110° F. As the oil temperature increases above 110° F., the percent oil temperature limit signal will increase at a rate designed to reduce the permitted torque to values as prescribed by the engine temperatures versus permitted torque curve (FIG. 10). All of the above descriptions have been related to the operation of the engine with air manifold temperatures being at a minimum and therefore permitted maximum torque. However, it can be seen that as the air manifold temperature increases, the point at which the oil temperature limit becomes effective is also increased. It can be seen that the air manifold temperature limit line and the lube oil temperature limit line do not have equal slopes. Resistors 53N and 53C are sized to provide equal changes in current as the air and oil temperature voltages change from minimum to maximum limit points. As the air manifold temperature increases, the current through resistor 53N increases to null increases in current through resistor 53C that results from an increase in oil temperature. The ratio of resistors 53C and 53N is such that if the oil temperature rises at a rate greater than the air temperature, the current through resistor 53C will exceed that through 53N and a percent oil temperature limit voltage will be generated.

Referring now to FIG. 6, the jacket water temperature sensed by the thermistor 6T and jacket water temperature limit signals are treated the same as the previously described oil and oil temperature limit signals.

Having generated the air manifold temperature and the oil and water temperature limit signals, it is now necessary to convert these to a set point for the torque control unit. This set point is generated in the operational amplifier shown in FIG. 6 consisting of transistors 64T, 64V, 64W, 64Y, 64Z, and negative feedback resistors 64E and 64F. The signal generated is called percent torque bias. From the engine temperature versus engine torque curves (FIG. 10), it can be seen that at 80° F. air manifold temperature, the percent torque bias should be at a maximum of +24%. As the air manifold temperature increases, the current through resistors 64A and 64B will increase at a rate such that the output of the percent torque bias amplifier will be 0% at 130° air manifold temperature. It can also be seen that as either the percent jacket water temperature limit or the percent oil temperature limit increases, the current through resistor 64N will increase at a rate such that, for example, a 10% increase in one of the temperature limits will result in a 10% decrease in the percent torque bias signal.

In summation, it can be seen that the temperature monitor and bias circuits are designed to measure the important engine temperatures and generate a percent torque bias signal which is used as a torque set point to automatically maintain the engine torque load at an optimum value as indicated by the engine temperatures versus engine torque curves (FIG. 10).

In keeping with the intent to provide a single system suitable for all types of engines, provisions are made whereby the load control system in an unattended station can be set to reduce engine horsepower by unloading the engine to 100% torque prior to reducing engine speed. Where such action is required, the jumper between pins 63 and 65 (FIG. 6) on the percent torque bias amplifier is removed and at pin 65 a negative voltage is inserted which reduces from a maximum at maximum torque to 0 at 100% torque. This voltage is generated by the automatic throughput or load control system, as shown in FIG. 6. Some engines are so constructed that it is not advantageous to reduce torque prior to reducing speed. Provisions have been made to reduce torque simultaneous with reductions in speed. This has been handled in the torque control section and will be described later.

Having described systems for generating a signal proportional to percent rated torque and for generating torque set point signals for operations at greater than rated torques, the systems for utilizing these signals in generating control action will be described.

As shown in FIG. 7, transistors 71T, 71V, 71W, 71Y, and 71Z form an operational amplifier with resistors 71G and 71F as a negative feedback circuit. The inputs to this amplifier are such that the output voltage changes as a function of the deviation from permitted torque.

There are five inputs to this amplifier consisting of:

(1) The current through resistors 71B and 71P is such that the output of the amplifier will be at 4.8 volts when the algebraic sum of all other input currents is 0. The 4.8 volts indicates that the engine is operating at ±0% deviation from the maximum permitted torque.

(2) The voltage at pin 71B will be connected to a positive voltage which varies as a function of r.p.m. It can be seen that as the r.p.m. voltage drops, the current through resistors 71A and 71B will drop which will in turn cause an increase in the output voltage of the operational amplifier. This increase in output voltage will cause a control action to decrease engine torque. As previously indicated in column 3, this circuit is used only where it is required to simultaneously decrease engine torque and speed. Resistors 71A and 71B are so sized that the percent reduction of rated torque is less than the reduction in horsepower resulting from any given reduction in speed. With engines having modulating ignition timing systems, a 100% torque set point is maintained regardless of speed changes.

(3) The current through resistors 71C and 71D is a function of the percent rated torque voltage. Since the percent rated torque voltage is negative, it can be seen that any negative excursions of this voltage will result in a positive excursion of the Percent Permissive Torque voltage which, in turn, will result in a control action to reduce the percent rated torque.

(4) The current through resistor 71E varies as a function of the Percent Torque Bias signal. Since the Percent Torque Bias signal is positive, it can be seen that as the Percent Torque Bias signal voltage goes more positive, the output voltage of the amplifier will decrease. To describe the control action, a decrease in Percent Torque Bias voltage will result in a decrease in the Percent Permissive Torque voltage which, in turn, results in a control action to increase percent rated torque. The final result is that the Percent Rated Torque voltage takes a negative excursion to a value where the change in current through resistors 71D and 71C is equal to the change in current through resistor 71E.

(5) The current through resistor 71Q varies as a function of the voltage at pin 71. The voltage at pin 71 is switched from open circuit to −12.15 volts by the unload relay. The unload relay is energized at any time it is desired to operate the engine at minimum possible torque. For example, during engine warm up and cool down periods, it can be seen that as the unload relay contacts are closed, the current through resistor 71Q will be such that the Percent Permissive Torque voltage will be at a maximum which, in turn, will result in a control action to open pockets sequentially until all pockets are open. The magnitude of the current through resistor 71Q is such that it will completely over ride any other signals calling for pockets to close.

Having generated the Percent Permissive Torque signal which varies as a function of the deviation of actual operating torque from the permitted torque, it is now necessary to generate the control action which will try to correct for the differences.

In FIG. 7, transistors 72-1 through 72-8 form a special purpose detector and relay drive circuit. Resistors 72A and 72B are sized to make a voltage divider such that when the Percent Permissive Torque signal is at zero percent, the voltage at the base of transistor 72-1 is 0 volt with respect to ground. As the Percent Permissive Torque signal increases, the voltage divider action results in a positive voltage with reference to ground at the base of transistor 72-1. This, in turn, causes transistor 72-1 to increase the collector to emitter current which reduces the voltage at the base of transistors 72-3. A reduction in voltage at the base of 72-3 results in the collector to emitter current going to zero which, in turn, results in the current through resistor 72F going through the base to emitter junction of transistor 72-4. Resistor 72F is sized to provide adequate base to emitter current to saturate transistor 72-4. The saturation of transistor 72-4 causes the collector to emitter junction to draw sufficient current to reduce the collector voltage to within 0.2 volt of ground and thereby cause the open lamp to burn brightly and to reduce the voltage of the base to emitter junction of transistor 72-5 to a point where the collector to emitter current falls to 0. The current through resistor 72J will now charge capacitor 72K until such time as the voltage of the emitter of transistor 72-6 reaches the peak point, the transistor will avalanche and discharge capacitor 72K through the emitter to base 1 junction of transistor 72-6 through resistor 72R and through the parallel circuits of resistor 72S and the base to emitter junction of transistor 72-7. It can be seen that transistors 72-7 and 72-8 form a R-S flipflop circuit which energizes and holds the open relay until such time as the 72-8 transistor base to emitter junction is forward biased.

As pockets 23 are opened, the percent rated torque signal will be reduced which, in turn, will reduce the voltage of the Percent Permissive Torque signal and result in the base of the transistor 72-1 going negative with respect to ground. It can be seen that as the base of transistor 72-1 goes negative, transistor 72-3 will be turned on and transistor 72-4 will be turned off. As transistor 72-4 is turned off, the open light will be extinguished, the base to emitter junction of transistor 72-5 will be forward biased and the base to emitter junction of transistor 72-8 will be forward biased. As transistor 72-5 is forward biased, it can be seen that the current through resistor 72J will be routed through the collector to emitter junction of transistor 72-5 and the voltage at the emitter of transistor 72-6 will be held at or near ground potential. It can also be seen that as the base to emitter junction of transistor 72-8 is momentarily forward biased, the open relay will be de-energized to cause the pocket sequencer to cease opening additional pockets.

Referring now to FIG. 8, it can be seen that the circuits consisting of transistors 83-1 through 83-8 form a similar circuit to that of transistors 72-1 through 72-8. A primary difference is that the circuit is connected to energize the close relay as the Percent Permissive Torque voltage falls and that the point at which the close relay is energized is adjustable. It can be shown that changing the fixed volume in a compressor cylinder will result in a change in required engine torque. This change is a function of the pressure ratio across the compressor and of the suction pressure. The point at which the compressor should reclose a pocket can be selected either manually by switches or automatically by circuitry which determines the minimum change in torque required to close a pocket following each pocket operation and adjust the circuit to a point just greater than the minimum.

FIG. 9 is a schematic diagram of the speed transmitter. This transmitter system is designed to take pulses from an ignition system and provide a DC signal proportional to engine speed.

Several unique features of this transmitter are:

(1) The ability to operate with signals from nearly any type of ignition system.

(2) The versatility of providing either suppressed or expanded scales by the mere connection of jumpers and the sizing of resistors.

(3) The transducer can be connected to provide an output in which:

(a) The output current varies as a function of speed and is relatively independent of load resistance changes.

(b) The output voltage varies as a function of speed and is relatively independent of load resistance changes.

Where the ignition system involved generates a voltage each time a cylinder is fired, connections are made to one or more cylinders to provide a pulse input to the transducer each time a cylinder is fired. It is the function of transistor 9Q1, 9Q2 and related circuitry to filter and shape the ignition pulses. The sizing and interconnection of components, as shown, is that required for an American Bosch pulsetronic ignition system. Transistor 9Q3, capacitor 9C3, and diodes 9D3 and 9D4 form a frequency to current converter. It can be seen that as transistor 9Q3 is turned off, the collector voltage will rise until it is equal to the power supply voltage and charge capacitor 9C3 through diode 9D4. At the point in time at which the ignition fires the plug, transistor 9Q3 is turned on. It can be seen that capacitor 9C3 will be discharged through the collector to emitter junction of transistor 9Q3 and through diode 9D3. It can be seen that the current through diode 9D3 will result in a negative charge on capacitor 9C4 and a resultant lowering of voltage on the base of 9Q4. Transistors 9Q4, 9Q5, 9Q6, 9Q7, and 9Q8 form an operational amplifier with a negative feedback through the resistors 9R11 and 9R10. It can be seen that in an ordinary operational amplifier, any abrupt change in voltage at the base of 9Q4 will cause a corresponding amplified change of voltage at the emitter of 9Q8. There are several unique features designed into this amplifier which make it suited for operation with a pulsating input while providing a steady DC output. The first of these is capacitor 9C6. It can be seen that as transistor 9Q5 switches on and off, capacitor 9C6 and resistor 9R13 form an RC network with a long time constant and therefore provide a steady DC voltage at the base of transistor 9Q6. Any long term changes in the ratio of the on to off time of transistor 9Q5 will result in an average change in voltage at the base of transistor 9Q6. A second design feature intended to minimize pulsation in the output is capacitor 9C4. It can be seen as current flows through diode 9D3, the charge will be a function of the voltage times the capacitance of capacitor 9C3. Since the ratio of capacitor 9C3 to 9C4 is very great, it can be seen that the change in voltage across capacitor 9C4 will be very slight each time capacitor 9C3 is discharged. Capacitor 9C4 also serves the function of averaging the current which flows through diode 9D3 to provide a relatively stable reference voltage so that as 9C6 is discharged each time, a fixed quantity of current is drawn through diode 9D3.

It is characteristic of engine compressor sets to not run at constant angular velocities. The fluctuations very from a maximum during intervals of less than one revolution to a moderate amount over intervals of approximately 6 to 7 seconds. The equipment is designed to compensate for short term variations in speed as follows: It can be seen that a certain change in voltage on the emitter of 9Q8 will result in a high current flow through capacitor 9C5 to the base of the transistor 9Q4. The direction of this current flow will be such as to cause the voltage on the emitter of 9Q8 to change in a direction to oppose that which caused the initial current flow. Capacitor 9C5 is sized to allow negligible swings in voltage at the emitter of transistor 9Q8 for a normally operating engine compressor set. Depending on the application, it is sometimes necessary to have the output voltage remain at 0 until some selected speed has been reached. This is accomplished by connecting a resistor to the plus voltage reference and therefore supplying a current through resistors 9R9 and 9R17 to the base of transistor 9Q4. It can be seen that if the current through resistors 9R9 and 9R17 is equal to the average current through diode 9D3 at any selected r.p.m., the base of transistor 9Q4 will remain positive until such time as this selected speed has been reached. It can then be seen that the span resistors 9R11 and 9R10 can be so sized as to provide a full range of output voltage over a narrow span of speed change.

Further modifications may be made in the invention as particularly described without departing from the scope thereof. Accordingly, the foregoing description is to be construed as illustratively only and is not to be construed as a limitation upon the invention as defined in the following claims.

What is claimed is:

1. In a control system for an engine connected to operate a compressor having pockets which are arranged for opening and closing to vary engine torque loading and throughput, the combination comprising:

means for sensing the speed of said engine;
means for sensing the rate of fuel consumption by said engine;
circuit means connected to said speed and fuel sensing means and arranged to produce a first electrical signal functionally related to said speed and fuel consumption and representative of torque load on said engine;
an electrical controller circuit connected to receive said first signal as the measurement input and arranged to provide an electrical output which is related to a torque set point;
means for varying said torque set point in response to changes in operating conditions of said engine and throughput requirements;
a pneumatic sequencer arranged to open and close said pockets in said compressor to vary torque load on said engine; and
means for applying said electrical output to said pneumatic sequencer to thereby vary the torque load on said engine in response to variations in said torque set point.

2. In a control system for an engine connected to operate a compressor having pockets which are arranged for opening and closing to vary engine torque loading and throughput, the combination comprising:

means for generating a first electrical signal representative of torque load on said engine;
an electrical controller circuit connected to receive said first signal as the measurement input and arranged to provide an electrical output which is related to a torque set point;
means for varying said torque set point in response to changes in operating conditions of said engine and throughput requirements, said means including means for sensing the air manifold temperature of said engine and generating a second electrical signal representative thereof, and means for applying said second electrical signal to said controller circuit to thereby vary said torque set point when manifold air temperature varies within predetermined limits;
a pneumatic sequencer arranged to open and close said pockets in said compressor to vary torque load on said engine; and
means for applying said electrical output to said pneumatic sequencer to thereby vary the torque load on said engine in response to variations in said torque set point.

3. In a control system for an engine connected to operate a compressor having pockets which are arranged for opening and closing to vary engine torque loading and throughput, the combination comprising:

means for generating a first electrical signal representative of torque load on said engine;
an electrical controller circuit connected to receive said first signal as the measurement input and arranged to provide an electrical output which is related to a torque set point;
means for varying said torque set point in response to changes in operating conditions of said engine and throughput requirements, said means including means for sensing the jacket water temperature of said engine and generating a second electrical signal representative thereof, and means for applying said second electrical signal to said controller circuit to thereby vary said torque set point when jacket water temperature varies within predetermined limits;
a pneumatic sequencer arranged to open and close said pockets in said compressor to vary torque load on said engine; and
means for applying said electrical output to said pneumatic sequencer to thereby vary the torque load on said engine in response to variations in said torque set point.

4. In a control system for an engine connected to operate a compressor having pockets which are arranged for opening and closing to vary engine torque loading and throughput, the combination comprising:
means for generating a first electrical signal representative of torque load on said engine;
an electrical controller circuit connected to receive said first signal as the measurement input and arranged to provided an electrical output which is related to a torque set point;
means for varying said torque set point in response to changes in operating conditions of said engine and throughput requirements, said means including means for measuring the lube oil in temperature and generating a second electrical signal representative thereof, and means for applying said second electrical signal to said controller circuit to thereby vary said torque set point when lube oil in temperature varies within predetermined limits;
a pneumatic sequencer arranged to open and close said pockets in said compressor to vary torque load on said engine; and
means for applying said electrical output to said pneumatic sequencer to thereby vary the torque load on said engine in response to variations in said torque set point.

5. In a control system for an engine connected to operate a compressor having pockets which are arranged for opening and closing to vary engine torque loading and throughput, the combination comprising:
means for generating a first electrical signal representative of torque load on said engine;
an electrical controller circuit connected to receive said first signal as the measurement input and arranged to provide an electrical output which is related to a torque set point;
means for varying said torque set point in response to changes in operating conditions of said engine and throughput requirements;
a pneumatic sequencer arranged to open and close said pockets in said compressor to vary torque load on said engine; and
means for applying said electrical output to said pneumatic sequencer to thereby vary the torque load on said engine in response to variations in said torque set point, said applying means including:
a high level detector circuit arranged to transmit a signal for closing said pockets;
a low level detector circuit arranged to transmit a signal for closng sad pockets;
a plurality of switches, each of which controls the opening and closing of one of said pockets;
pneumatically driven cam means arranged to open and close said switches in response to relative movement therewith; and
means connected to said high and low level detector circuits for causing said cam means to move relative to said switches.

6. In a method of controlling torque loading on an engine connected to operate a compressor having pockets which are arranged for opening and closing to vary engine torque loading and throughput, the combination comprising the steps of:
sensing the fuel consumption and speed of said engine and generating a first electrical signal functionally related thereto and representative of torque load on said engine;
generating a second electrical signal representative of a change in at least one operational parameter of said engine and throughput requirement;
generating a third electrical signal which varies as a function of the deviation of said first signal relative to said second signal;
applying said third signal to a pneumatic sequencer to open and close said pockets in said compressor to thereby vary the torque load on said engine in response to variations in said second signal relative to said first signal.

7. In a method of controlling torque loading on an engine connected to operate a compressor having pockets which are arranged for opening and closing to vary engine torque loading and throughput, the combination comprising the steps of:
generating a first electrical signal representative of torque load on said engine;
sensing at least one of the temperatures comprising air manifold temperature, engine jacket water temperature, and engine lube oil temperature, and generating a second electrical signal functionally related to changes in said temperature beyond predetermined limits;
generating a third electrical signal which varies as a function of the deviation of said first signal relative to said second signal;
applying said third signal to a pneumatic sequencer to open and close said pockets in said compressor to thereby vary the torque load on said engine in response to variations in said second signal relative to said first signal.

8. The invention as claimed in claim 1 wherein said means for varying the torque set point include:
means for generating a second electrical signal representative of station throughput requirements for said compressor; and
means for applying said second electrical signal to said controller circuit to thereby vary said torque set point when said throughput requirements vary within predetermined limits.

References Cited

UNITED STATES PATENTS

| | | | |
|---|---|---|---|
| 2,349,560 | 5/1944 | Reijnst | 73—115 X |
| 3,024,964 | 3/1962 | Emmel | 230—21 |
| 3,084,847 | 4/1963 | Smith | 230—21 |
| 3,096,926 | 7/1963 | Koch et al. | 230—21 X |
| 3,229,895 | 1/1966 | West et al. | 230—2 |
| 3,329,133 | 7/1967 | Panhard | 230—56 X |

DONLEY J. STOCKING, Primary Examiner

W. J. KRAUS, Assistant Examiner

U.S. Cl. X.R.

230—56